United States Patent [19]
Park

[11] Patent Number: 5,505,378
[45] Date of Patent: Apr. 9, 1996

[54] AIR-CONDITIONER CONTROLLABLE TO SIMULATE ENVIRONMENTAL CHARACTERISTICS OF VARIOUS WORLD REGIONS

[75] Inventor: Jong C. Park, Suwon, Rep. of Korea

[73] Assignee: Samsung Electronics Co., Ltd., Suwon, Rep. of Korea

[21] Appl. No.: 330,996

[22] Filed: Oct. 28, 1994

[30] Foreign Application Priority Data

Mar. 31, 1994 [KR] Rep. of Korea .................... 1994-6764

[51] Int. Cl.⁶ .................................................... F24F 7/00
[52] U.S. Cl. ................................. 236/493; 165/48.1
[58] Field of Search ................... 236/49.3, 51; 352/85; 165/48.1

[56] References Cited

U.S. PATENT DOCUMENTS

| | | | |
|---|---|---|---|
| 4,629,604 | 12/1986 | Spector | 352/85 X |
| 4,861,967 | 8/1989 | Yoshimura | 219/241 |
| 4,919,197 | 4/1990 | Murakami | 165/48.1 |
| 5,097,671 | 3/1992 | Jeong-Hun | 236/51 X |
| 5,156,203 | 10/1992 | Funakoshi et al. | 236/51 X |

*Primary Examiner*—William E. Tapolcai
*Attorney, Agent, or Firm*—Burns, Doane, Swecker & Mathis

[57] ABSTRACT

An air conditioner which discharges an air flow to a room is operated to provide the room with the environmental characteristics of a selected region of the world by varying the air direction, air speed, air fragrance, and background noise to conform to those of the selected world region.

15 Claims, 4 Drawing Sheets

"A" AREA WIND SPEED PATTERN

"B" AREA WIND SPEED PATTERN

"C" AREA WIND SPEED PATTERN

AIR-CONDITIONER CONTROLLABLE TO SIMULATE ENVIRONMENTAL CHARACTERISTICS OF VARIOUS WORLD REGIONS

BACKGROUND OF THE INVENTION

The invention is related to providing an air-conditioner and control method thereof and, in particular, to providing an air-conditioner and control method thereof for controlling various characteristics of a discharged air flow wind from the air-conditioner to approach the natural breeze and for producing various acoustic sounds and fragrances.

BACKGROUND OF DISCLOSURES

A conventional air-conditioner is used to control the flow rate of wind (i.e., cool air) by varying the operation speed of a fan motor or a compressor motor according to a room temperature and the desired temperature. The wind direction is controlled by varying the rotational angle or speed of motors, which rotate a left and right rotation louver and an up and down rotation louver. For example, the conventional air-conditioner enables an infrared ray sensor to detect a number of dwellers and their positions in a room and subsequently control the louver rotation motor so that heat-exchanged air is blown toward or circulated between areas occupied by the dwellers are remaining.

However, in the conventional air-conditioner the flow rate is in general fixed by the relationship between the room temperature and the desired temperature. This can produce an unpleasant feeling to users during the cooling or warming operation, and furthermore users are exposed directly to heat-exchanged air to be made sick by the air-conditioning.

In order to solve these problems as described above, Japan Laid-Open Patent Publication No. 1992-161746 discloses an air-conditioner for enabling comfortable air-conditioning to correspond to the choice by a user, in which an indoor unit is provided with a memory with a plurality of variable patterns for temperature, air velocity, and radiation temperature in which two of them or one of them has been previously programmed. The unit is provided with a switch enabling a user to select arbitrarily among the variable patterns provided. The publication has limits in being able to provide a natural-feeling environment in that only air speed and temperature can be varied.

Accordingly, the main object of the invention is to provide an air-conditioner and control method thereof for discharging wind similar to natural wind.

The other object of the invention is to provide an air-conditioner and control method thereof for varying the direction and speed of wind on the basis of the formula introducing a randomness of natural wind.

Another object of the invention is to provide an air-conditioner and control method thereof for producing nature's acoustic sounds and fragrances corresponding to any specific area.

SUMMARY OF THE INVENTION

According to the invention, an air-conditioner comprises a key inputting portion provided with a plurality of area selecting keys corresponding to places of note throughout the world, an area data storage portion containing area environment information about corresponding world areas, and a control portion for receiving an area selection signal from the area selecting keys, reading the area environment information from the area data storage portion and controlling all the operation of a system based on the read data, in which the environment data or information includes a wind pattern formula or temperature information introduced by a randomness theory with respect to the patterns of wind speed and direction changes corresponding to each world area.

Furthermore, the air-conditioner comprises a fragrance generating portion and a sound reproducing portion representing the characteristics of each world area, and the key inputting portion furthermore comprises keys for turning on/off the fragrance or sound reproducing portion to generate the fragrance or sound related to each area.

A control method of an air-conditioner for air-conditioning room at a temperature, a wind pattern, a sound or a fragrance related to a plurality of world places comprises steps of: judging whether a world the area operation is selected; determining the type of place selected if one place is selected; operating the air-conditioner according to a wind pattern and a temperature corresponding to the selected world places in addition to the generating of the fragrance and sound peculiar to the selected area, in which the wind pattern is obtained in the derivation formula by which the speed or direction changes of wind formed in each of corresponding areas are adapted to the chaos theory.

BRIEF DESCRIPTION OF THE DRAWINGS

The invention will be explained in detail with reference to the drawings, in which.

DETAILED DESCRIPTION OF THE PREFERRED EMBODIMENT OF THE INVENTION

Figure 1:
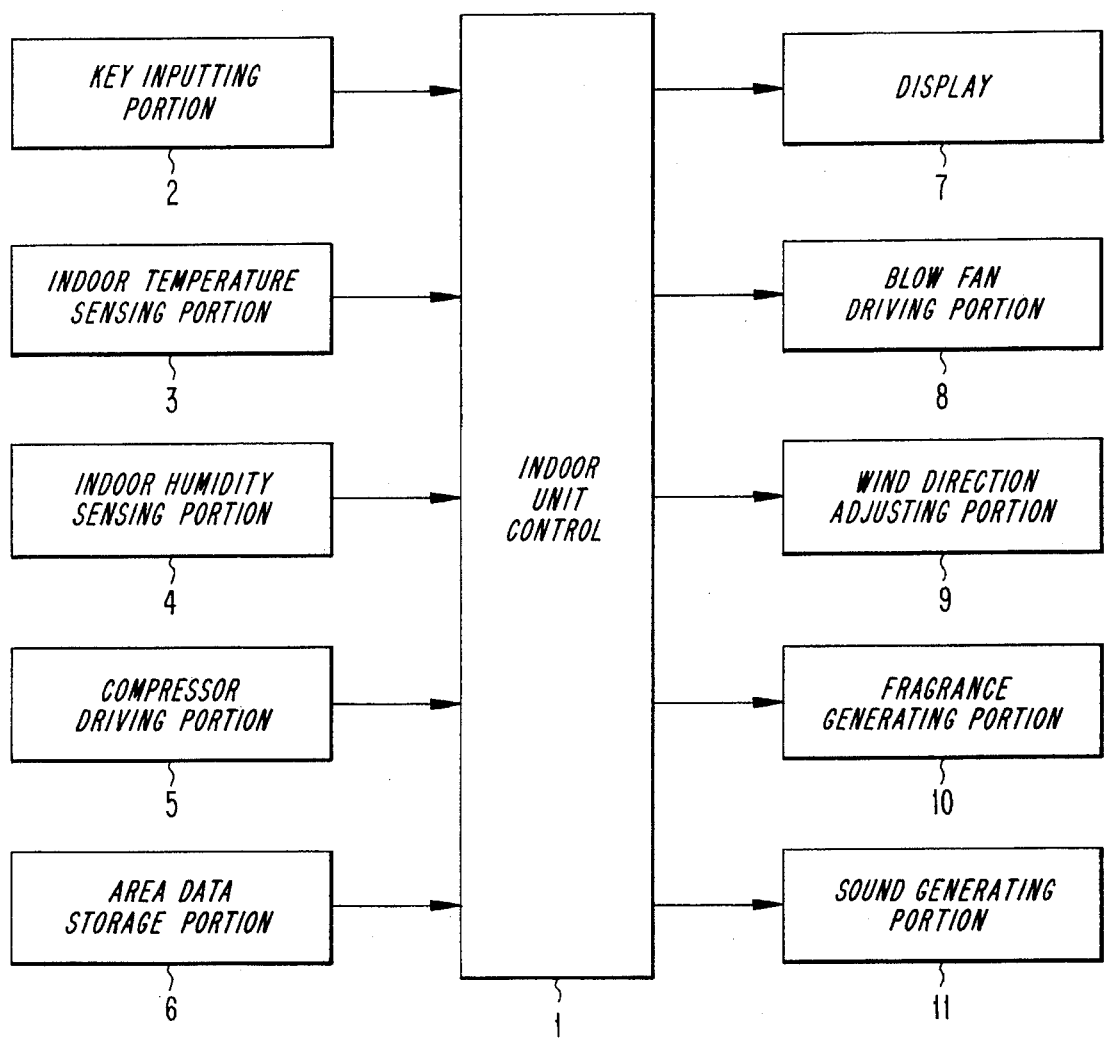
FIG. 1 is a schematic block diagram representing the configuration of an air-conditioner according to the invention.

Referring to FIG. 1, an air-conditioner according to the invention comprises an indoor unit control 1 for controlling the operation of an indoor unit, a key inputting portion 2 including various function keys and area selecting keys, an indoor temperature sensing portion 3 for sensing the temperature of room air, an indoor humidity sensing portion 4 for sensing the humidity of room air, a compressor driving portion 5 for operating a compressor which is constituted as a part of a cooling cycle, an area data storage portion 6 containing memory relating to the speed or direction changing patterns of wind typically occurring in a plurality of places well-known; a display 7 for displaying the operation state and various information of the air-conditioner; a fan operating portion 8 for operating a fan to discharge heat-exchanged air from an indoor heat-exchanger into room; a wind direction adjusting portion 9 for adjusting the direction of air to be discharged into a room; a fragrance generating portion 10 for selectively generating one of a selection of fragrances peculiar to a plurality of places; and a sound reproducing portion 11 for selectively reproducing one of a selection of sounds peculiar to a plurality of places.

Herein, the key inputting portion 2 includes an area selecting key for selecting any one of the famous places in the world and function keys for turning on/off the fragrance generating portion 10 and the sound reproducing portion 11, which is provided on the front surface of a remote control or the air-conditioner. The area data storage portion 6 contains various information on the formulas a–c modelled according to the randomness theory applicable to wind speed patterns of wind in various areas. The direction patterns of wind are measured at a plurality of places well-known and their properties are analyzed in a time series setting manner. The fragrance generating portion 10 contains numerous synthetic fragrances such as grass, leaves, acacias, seas, pines etc., so that it generates the fragrance corresponding to the area selected by users. The generated fragrance is carried with air to be discharged into a room by the fan.

Figure 3:
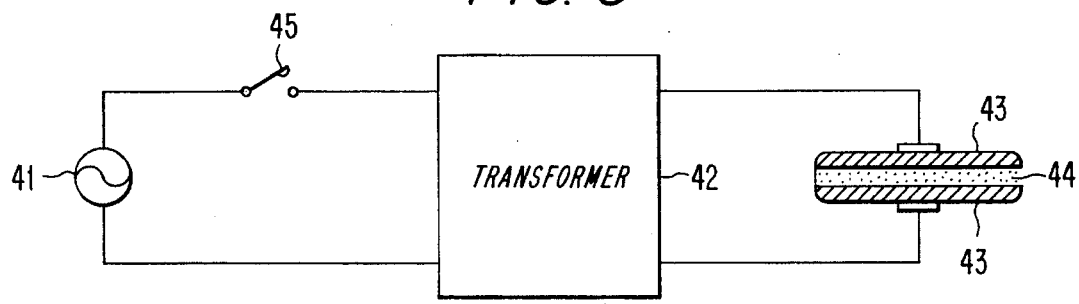
FIG. 3 is a circuit of a fragrance generating portion for use in the air-conditioner according to the invention; and, FIGS. 4a and 4b are flow charts illustrating a control method of the air-conditioner according to the invention.
Figure 2A:
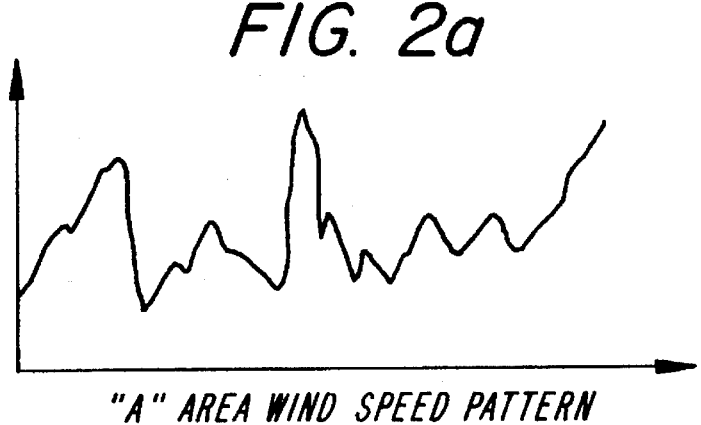
FIGS. 2a, 2b and 2c are waveform views showing the speed or direction changes of wind corresponding to places of note.
Figure 2B:
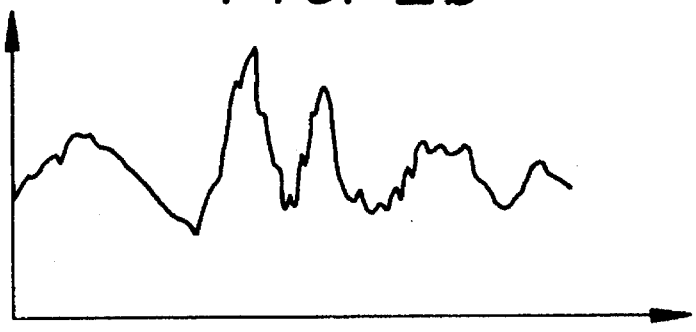
Figure 2C:
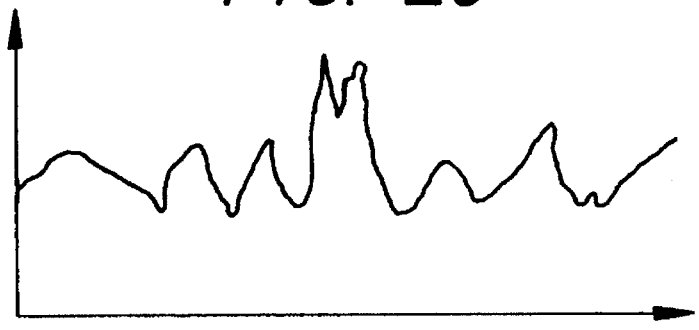

FIG. 3 is a circuit illustrating an example of a fragrance generating portion 10 for use in an air-conditioner according to the invention. The fragrance generating portion comprises a transformer 42 for increasing the voltage of a commercial power source 41 to a few kilovolts (Kv), a pair of electrodes 43 connected to the secondary coil of the transformer 42, respectively, a solid perfume 44 provided between a pair of electrodes 43 and a switch 45 provided to apply or interrupt the current of the commercial power source 41 to the first side of the transformer 42. The fragrance generating portion 10 is operated to apply the commercial power source to the first coils of the transformer 42, when the switch 45 is turned on. Thus, the transformer 42 outputs the voltage stepped-up by a few kilovolts at its secondary coils to a pair of electrodes 43. The high voltage causes a corona-discharge between electrodes 43 to generate high temperature which burns solid perfume 44 for generating the fragrance. That constitutes a forced gasifying of a solid, but the fragrance can be in a gas, liquid or solid phase. A fragrance in a gas or liquid phase would be forcedly sprayed. The sound reproducing portion 11 includes a memory which contains data in the form of sounds previously recorded at famous places or various natural sounds edited/recorded in situ. These sounds are digitized to reproduce the corresponding data that can be selected by a control signal from the control portion 1.

Figure 4A:
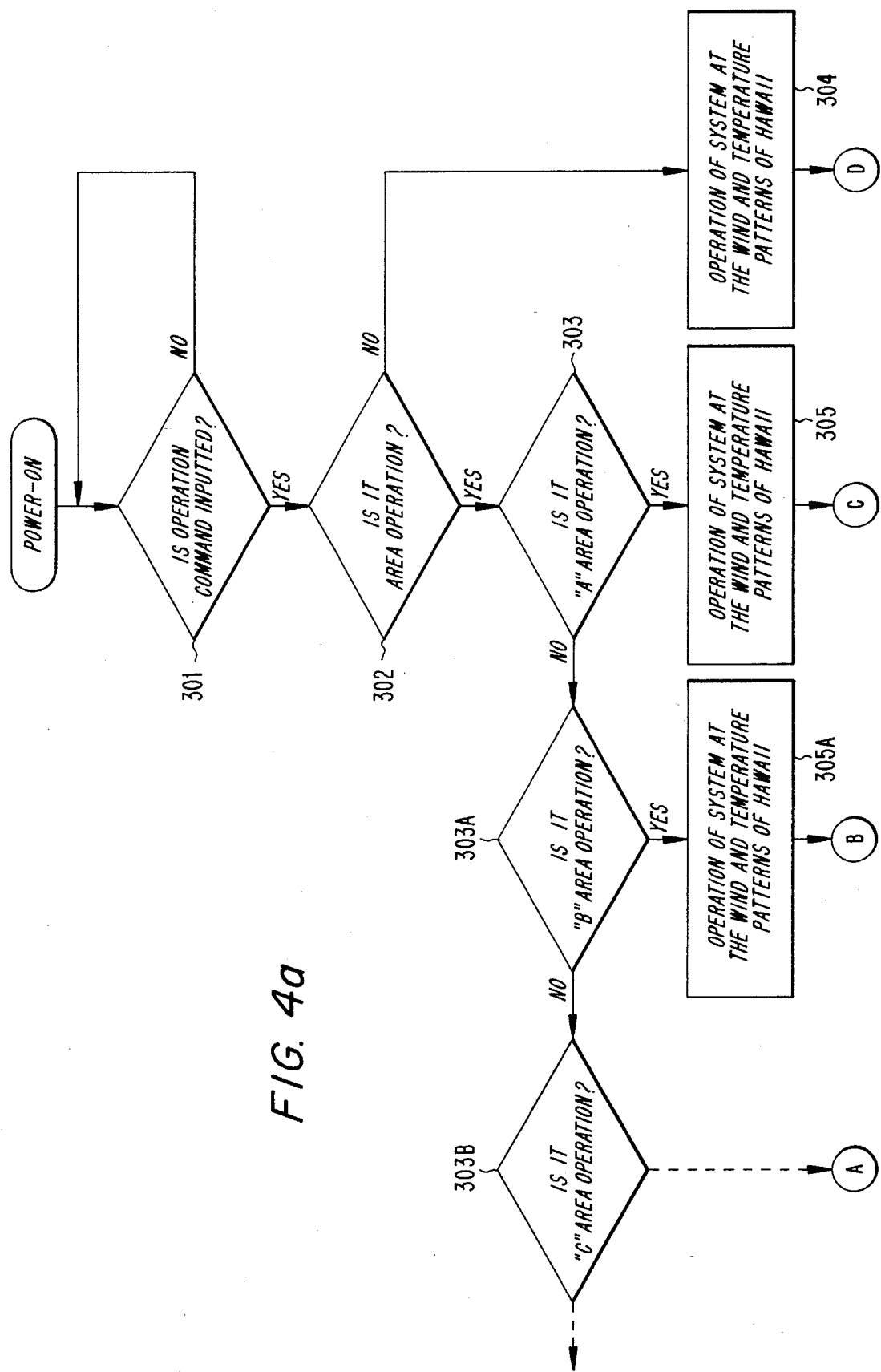
Figure 4B:
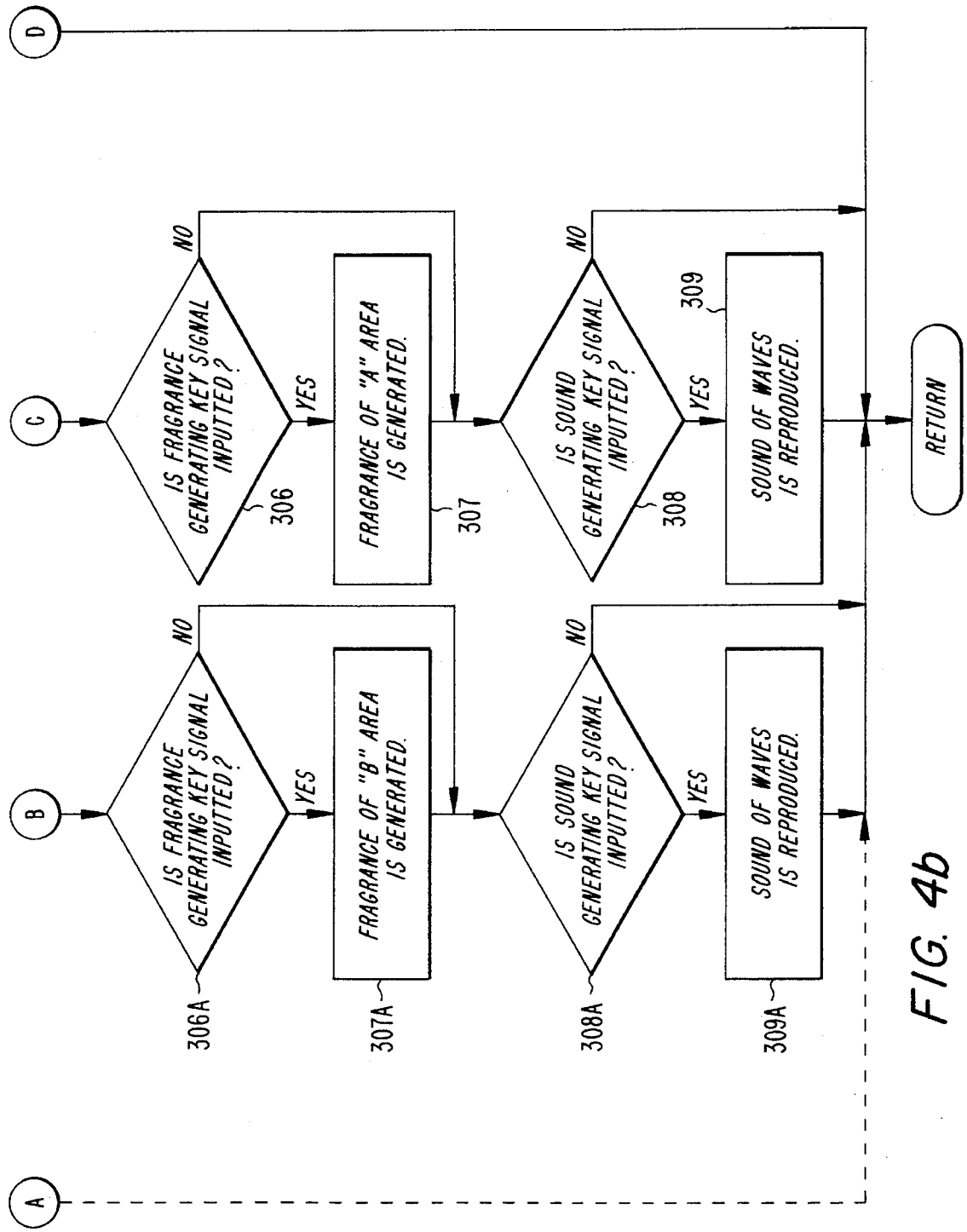

Referring to FIGS. 4a and 4b, the operation control method of the air-conditioner is as follows:

The power source is first applied to the air-conditioner, and the control portion 1 is initialized. At step 301, it is judged whether the operation command is inputted. If the operation command is not inputted, the operation waiting state is kept. If the operation command is inputted, step 301 proceeds to step 302 to determine whether area operation is selected. If area operation is not selected, control is performed at step 304 to operate the air-conditioner at the wind speed and the temperature set by users through the key inputting portion 2. If area operation is selected, step 303, 303A, 303B,—are performed in order to determine which are is selected. If the operation of the "A" area, for example Hawaii, is selected at step 303, step 302 goes on step 305 to operate the compressor operation portion 5 and the fan driving portion 8 based on data of the wind direction, speed and temperature patterns corresponding to Hawaii which are processed from the data storage portion 6. Next, it is judged at step 306 whether the fragrance generating key signal is inputted. If the fragrance generating key signal is inputted, step 306 goes to step 307 to generate the fragrance of Hawaii such as sea fragrance. Then, step 308 is performed to determine whether the sound reproducing key signal inputted.

On the other hand, if the fragrance generating key signal is not inputted, step 307 skips to step 308 to determine whether the sound reproducing key signal is inputted. If the sound reproducing key is pressed, step 308 proceeds onto step 309 to reproduce the sound of Hawaii such as the sound of waves. Thereafter, the control portion returns to the main program in order to perform other operations.

Similarly, if the operation of the "A" area is not selected at step 303, step 303 goes on step 303A to determine whether the operation of "B" area is selected. If the operation of "B" area is selected, the control performs steps 304A, 305A, 306A, 307A, 308A and 309A so that the compressor operation portion 5 and the fan driving portion 8 based on data of the wind and temperature patterns corresponding to the "B" area processed from the data storage portion 6 are operated, and the fragrance and sound corresponding to the "B" area are generated/reproduced according to the inputting signals of the fragrance generating key and the sound reproducing key.

Also, it is judged at step 303B whether the operation of the "C" area is selected, if the operation of the A and B areas is not selected. If the operation of the "C" area is selected, the control performs steps 304B, 305B, 306B, 307B, 308B and 309B in order to produce the natural effects corresponding to the "C" area.

As described above, the invention performs the air-conditioning for producing the natural effects corresponding to famouse places in the world, in which the number of areas well-known to be selected can be expanded unless the capacity of the system does not allow it.

What is claimed is:

1. In an air conditioner including a heat exchanger through which an air flow is passed before being introduced into a room, the improvement comprising an environment control mechanism which includes:

a memory containing data relating to environmental characteristics of a plurality of known world regions said environmental characteristics including a wind pattern and natural air fragrance for each of said world regions;

generating means for generating said environmental characteristics for each of said world regions; and control means responsive to a user's input for selecting said environmental characteristics for one of said world regions including the respective wind pattern and air fragrance.

2. In an air conditioner according to claim 1, wherein said environmental characteristics are peculiar to known regions of the world.

3. In an air conditioner according to claim 1, wherein said environmental characteristics in said memory further comprise air speed and background noise; said generating means comprising means for changing air flow direction, means for changing air speed, means for introducing fragrances to the air flow and means for generating background noises.

4. In the air conditioner according to claim 1, wherein said generating means includes means for introducing one of a selected number of fragrances corresponding to a fragrance present in nature.

5. In the air conditioner according to claim 4, wherein said generating means further includes means for generating a background noise present in nature.

6. In the air conditioner according to claim 1, wherein said generating means includes means for generating a background noise present in nature.

7. In an air conditioner according to claim 6, wherein said means for introducing a fragrance includes a solid perfume mounted between a pair of electrodes and means for energizing said electrodes for producing a corona discharge thereacross for gasifying said solid perfume.

8. In the air conditioner according to claim 5, wherein said generating means further comprises means for changing air direction and speed in accordance with a random pattern.

9. In the air conditioner according to claim 1, wherein said generating means further comprises means changing air direction and speed in accordance with a random pattern.

10. In an air conditioner according to claim 1, wherein said improvement further comprises a keyboard for entering a user's selected environmental characteristics to said control means.

11. In a method of controlling an air conditioner in which an air flow is directed through a heat exchanger before being introduced into a room, the improvement comprising the steps of:

A) sensing whether a user has selected environmental characteristics peculiar to a selected known region of the world among a plurality of known regions of the world stored in memory, said environmental characteristics including a wind pattern and natural air fragrance for each world region; and B) varying, in response to a selection of a world region in step A, at least wind pattern and air fragrance corresponding to the selected region.

12. In the method according to claim 11, wherein the wind pattern is varied in accordance with a random pattern.

13. In the method according to claim 11, wherein the air fragrance is varied by electronically gasifying a solid perfume and introducing the gaseous product into the air flow.

14. In the method according to claim 11, wherein the air fragrance is varied by introducing into the air flow a fragrance corresponding to a fragrance present in nature.

15. In the method according to claim 11, wherein said environmental characteristics include background noise present in nature.

* * * * *